(12) United States Patent
Fukuta (10) Patent No.: US 9,986,369 B2
(45) Date of Patent: May 29, 2018

(54) BASE STATION, USER TERMINAL, AND PROCESSOR

(71) Applicant: KYOCERA CORPORATION, Kyoto (JP)

(72) Inventor: Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 15/838,034

(22) Filed: Dec. 11, 2017

(65) Prior Publication Data

US 2018/0115857 A1  Apr. 26, 2018

Related U.S. Application Data (63) Continuation of application No. 14/892,439, filed as application No. PCT/JP2014/063579 on May 22, 2014, now Pat. No. 9,843,887.

(30) Foreign Application Priority Data

May 29, 2013  (JP) .................................. 2013-113508

(51) Int. Cl.
*H04W 4/00* (2018.01)
*H04W 76/02* (2009.01)
(Continued)

(52) U.S. Cl.
CPC ............ *H04W 4/005* (2013.01); *H04W 4/008* (2013.01); *H04W 4/023* (2013.01); *H04W 64/00* (2013.01);
(Continued)

(58) Field of Classification Search
CPC ..... H04W 4/005; H04W 4/008; H04W 4/023; H04W 8/005; H04W 64/00;
(Continued)

(56) References Cited

U.S. PATENT DOCUMENTS 8,081,933 B2   12/2011  Malaga et al.
8,306,482 B2   11/2012  Lee et al.
(Continued)

FOREIGN PATENT DOCUMENTS

JP   2012-217104 A   11/2012
WO   2011123516 A2   10/2011
(Continued)

OTHER PUBLICATIONS

3GPP TR 22.803 V12.1.0, "3rd Generation Partnership Project; Technical Specification Group Services and System Aspects; Feasibility study for Proximity Services (ProSe)," (Release 12) Nov. 2012.
(Continued)

*Primary Examiner* — Raymond Dean
(74) *Attorney, Agent, or Firm* — Studebaker & Brackett PC (57) ABSTRACT

A user terminal receives, from a base station, a measurement request for measurement of a reception intensity of a signal transmitted from another user terminal that performs D2D communication, and a threshold value used to determine whether to transmit measurement information related to the reception intensity. The user terminal measures reception intensity of the signal on the basis of the measurement request, and transmits to the base station, the measurement information enabling the base station to perform controls of the D2D communication in response to the measurement information satisfying the threshold value. The user terminal receives from the base station a location request for transmission of location information indicating geographical location of the user terminal. In response to the location request, the user terminal transmits the location information periodically to the base station, the location information (Continued)

enabling the base station to perform controls of the D2D communication.

3 Claims, 5 Drawing Sheets

(51) Int. Cl.
   *H04W 72/12* (2009.01)
   *H04W 4/02* (2018.01)
   *H04W 64/00* (2009.01)
   *H04W 72/04* (2009.01)
   *H04W 8/00* (2009.01)
   *H04W 92/18* (2009.01)

(52) U.S. Cl.
   CPC ..... *H04W 72/042* (2013.01); *H04W 72/1231* (2013.01); *H04W 76/023* (2013.01); *H04W 76/027* (2013.01); *H04W 8/005* (2013.01); *H04W 92/18* (2013.01)

(58) Field of Classification Search
   CPC ........... H04W 72/042; H04W 72/1231; H04W 76/023; H04W 76/027; H04W 92/18
   See application file for complete search history.

(56) References Cited

U.S. PATENT DOCUMENTS

| | | | |
|---|---|---|---|
| 9,320,047 B2 | 4/2016 | Li et al. | |
| 2007/0129076 A1* | 6/2007 | Cho | H04W 76/023 455/436 |
| 2013/0223356 A1 | 8/2013 | Khoshnevis et al. | |
| 2014/0213221 A1 | 7/2014 | Chai et al. | |
| 2014/0219116 A1 | 8/2014 | Iwamura et al. | |
| 2014/0243039 A1 | 8/2014 | Schmidt et al. | |
| 2014/0243040 A1 | 8/2014 | Bienas et al. | |
| 2014/0274196 A1 | 9/2014 | Dai et al. | |
| 2015/0208452 A1 | 7/2015 | Lee et al. | |
| 2015/0271859 A1 | 9/2015 | Huang et al. | |
| 2015/0282132 A1 | 10/2015 | Kim et al. | |
| 2015/0327047 A1 | 11/2015 | Tiirola et al. | |
| 2015/0373764 A1 | 12/2015 | Yu et al. | |
| 2015/0382173 A1 | 12/2015 | Wang et al. | |
| 2015/0382365 A1 | 12/2015 | Li et al. | |
| 2016/0057795 A1 | 2/2016 | Kim et al. | |
| 2016/0157283 A1 | 6/2016 | Yu et al. | |
| 2016/0205601 A1 | 7/2016 | Yiu | |

FOREIGN PATENT DOCUMENTS

| | | |
|---|---|---|
| WO | 2013/008167 A1 | 1/2013 |
| WO | 2014/139072 A1 | 9/2014 |

OTHER PUBLICATIONS

International Search Report with Written Opinion issued in Application No. PCT/JP2014/063579, dated Jul. 1, 2014.

An Office Action issued by the Japanese Patent Office dated Feb. 13, 2018, which corresponds to Japanese Patent Application No. 2017-211721 and is related to U.S. Appl. No. 15/838,034; with English language concise explanation.

\* cited by examiner

BASE STATION, USER TERMINAL, AND PROCESSOR

CROSS-REFERENCE TO RELATED APPLICATIONS

This application is a Continuation of U.S. patent application Ser. No. 14/892,439 filed Nov. 19, 2015, which is the U.S. National Phase Application of International Application No. PCT/JP2014/063579 filed May 22, 2014, and claims benefit of Japanese Patent Application No. 2013-113508 filed May 29, 2013, the entire contents of which are incorporated herein by reference.

TECHNICAL FIELD

A present disclosure relates to a base station, a user terminal, and a processor in a mobile communication system that supports D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1).

In the D2D communication, a plurality of neighboring user terminals perform direct communication without any intervention of a core network. That is, a data path of the D2D communication does not pass through the core network. On the other hand, a data path of normal communication (cellular communication) of the mobile communication system passes through the core network.

CITATION LIST

Non-Patent Document

Non Patent Document 1: 3GPP technical report "3GPP TR 22.803 V12.1.0" November 2012

SUMMARY

The current specifications have no mechanism for appropriately controlling the D2D communication. Thus, there is a problem that the D2D communication is not effectively utilized.

Therefore, the present disclosure provides a user terminal in a mobile communication system, a device for a user terminal in a mobile communication system, and a method for a mobile communication system, where the communication system is capable of effectively utilizing the D2D communication.

According to an embodiment, a user terminal in a mobile communication system that supports D2D communication that is direct device-to-device communication, comprises a receiver configured to receive, from a base station, a measurement request for requesting a measurement of a reception intensity of a signal transmitted from another user terminal that performs the D2D communication. The receiver is further configured to receive, from the base station, a threshold value used by the user terminal to determine whether to transmit measurement information related to the reception intensity. The user terminal comprises a controller configured to measure the reception intensity of the signal transmitted from the another user terminal on the basis of the measurement request; and a transmitter configured to transmit, to the base station, the measurement information in response to the measurement information satisfying the threshold value. The measurement information enables the base station to perform controls of the D2D communication. The receiver is further configured to receive a location request from the base station, where the location request requests transmission of location information indicating geographical location of the user terminal. In response to the location request, the transmitter is further configured to transmit the location information periodically to the base station, the location information enabling the base station to perform controls of the D2D communication.

According to an embodiment, a device for a user terminal in a mobile communication system that supports D2D communication that is direct device-to-device communication, comprises at least one processor configured to cause the user terminal to execute a process of receiving, from a base station, a measurement request for requesting a measurement of a reception intensity of a signal transmitted from another user terminal that performs the D2D communication, and a threshold value used by the user terminal to determine whether to transmit measurement information related to the reception intensity. The processor is configured to cause the user terminal to execute a process of measuring the reception intensity of the signal transmitted from the another user terminal on the basis of the measurement request, and transmitting, to the base station, the measurement information in response to the measurement information satisfying the threshold value. The measurement information enables the base station to perform controls of the D2D communication. The processor is configured to cause the user terminal to execute a process of receiving a location request from the base station, where the location request requests transmission of location information indicating geographical location of the user terminal. In response to the location request, processor is configured to cause the user terminal to execute a process of transmitting the location information periodically to the base station, where the location information enables the base station to perform controls of the D2D communication.

According to an embodiment, a method for a mobile communication system that supports D2D communication that is direct device-to-device communication, comprises transmitting, from a base station to a user terminal, a measurement request for requesting a measurement of a reception intensity of a signal transmitted from another user terminal that performs the D2D communication, and a threshold value used by the user terminal to determine whether to transmit measurement information related to the reception intensity. The method comprises measuring, at the user terminal, the reception intensity of the signal transmitted from the another user terminal on the basis of the measurement request, and transmitting, from the user terminal to the base station, the measurement information in response to the measurement information satisfying the threshold value. The measurement information enables the base station to perform controls of the D2D communication. The method comprises transmitting a location request from the base station to the user terminal, where the location request requests transmission of location information indicating geographical location of the user terminal. In response to the location request, the method transmits the location information periodically from the user terminal to the base station, where the location information enables the base station to perform controls of the D2D communication.

DESCRIPTION OF THE EMBODIMENT

Overview of Embodiment

A base station according to an embodiment in a mobile communication system that supports D2D communication that is direct device-to-device communication, comprises: a transmitter configured to transmit, to a user terminal, a measurement request for requesting a measurement of a reception intensity of a signal transmitted from another user terminal that performs the D2D communication; a receiver configured to receive, from the user terminal, measurement information indicating the reception intensity measured on the basis of the measurement request; and a controller configured to determine on the basis of the measurement information whether or not the user terminal is able to perform the D2D communication. The controller controls to instruct the D2D communication to be performed when determining that the user terminal is able to perform the D2D communication.

In the base station according to an embodiment, the transmitter transmits the measurement request when the user terminal performs cellular communication that passes through a core network, with the another user terminal.

In the base station according to an embodiment, the controller determines that the user terminal is able to perform the D2D communication and controls to transmit the measurement request, when the another user terminal exists in a cell which is managed by the base station and with which the user terminal establishes a connection or a neighboring cell adjacent to the cell.

In the base station according to an embodiment, the controller controls to transmit the measurement request when determining, on the basis of location information of the user terminal and location information of the another user terminal, that there is the user terminal near the another user terminal.

In the base station according to an embodiment, the controller controls to transmit the measurement request, when the receiver receives a proximity notification indicating that there is the user terminal near the another user terminal.

In the base station according to an embodiment, the controller controls to transmit the measurement request, when the receiver receives discovery information indicating that a discovery-use signal for discovering a partner terminal for the D2D communication is received, from the user terminal or the another user terminal.

In the base station according to an embodiment, the transmitter transmits, to the user terminal, scheduling information indicating a radio resource assigned to the another user terminal to perform the D2D communication in order that the user terminal measures the reception intensity.

In the base station according to an embodiment, the transmitter transmits decoding information used by the user terminal to decode the scheduling information, to the user terminal.

In the base station according to an embodiment, the transmitter transmits, to the user terminal, a threshold value used by the user terminal to determine whether or not to transmit the measurement information.

A user terminal according to an embodiment in a mobile communication system that supports D2D communication that is direct device-to-device communication, comprises: a receiver configured to receive, from a base station, a measurement request for requesting a measurement of a reception intensity of a signal transmitted from another user terminal that performs the D2D communication; a controller configured to control to measure the reception intensity of the signal transmitted from the another user terminal, on the basis of the measurement request; and a transmitter configured to transmit measurement information indicating the reception intensity, to the base station. The controller controls to perform the D2D communication with the another user terminal, when receiving, from the base station, a D2D instruction instructing the user terminal to perform the D2D communication with the another user terminal.

In the user terminal according to an embodiment, the transmitter transmits location information of the user terminal to the base station, and the receiver receives, from the base station, the measurement request transmitted on the basis of the location information.

In the user terminal according to an embodiment, the receiver receives location information of the another user terminal from the base station, the controller transmits, to the base station, a proximity notification indicating that there is the user terminal near the another user terminal, when determining on the basis of the location information of the another user terminal that there is the user terminal near the another user terminal, and the receiver receives, from the base station, the measurement request transmitted on the basis of the proximity notification.

In the user terminal according to an embodiment, the receiver receives, from the another user terminal, a discovery-use signal for discovering a partner terminal for the D2D communication, the transmitter transmits discovery information indicating that the discovery-use signal is received, to the base station, and the receiver receives, from the base station, the measurement request transmitted on the basis of the discovery information.

In the user terminal according to an embodiment, the receiver receives, from the base station, scheduling information indicating a radio resource assigned to the another user terminal to perform the D2D communication, and the controller controls to measure the reception intensity on the basis of the scheduling information.

In the user terminal according to an embodiment, the receiver receives, from the base station, decoding information for decoding the scheduling information, and the controller uses the decoding information to decode the scheduling information.

In the user terminal according to an embodiment, the controller controls to transmit the measurement information to the base station when the reception intensity exceeds a threshold value.

In the user terminal according to an embodiment, the signal is a reference signal used for the D2D communication.

A processor according to an embodiment is a processor provided in a user terminal in a mobile communication system that supports D2D communication that is direct device-to-device communication. The processor executes: a process of receiving, from a base station, a measurement request for requesting a measurement of a reception intensity of a signal transmitted from another user terminal that performs the D2D communication; a process of controlling to measure the reception intensity of the signal transmitted from the another user terminal, on the basis of the measurement request; a process of transmitting measurement information indicating the reception intensity, to the base station; and a process of performing the D2D communication with the another user terminal, when receiving, from the base station, a D2D instruction instructing the user terminal to perform the D2D communication with the another user terminal.

Hereinafter, with reference to the accompanying drawings, the following description will be provided for each embodiment when D2D communication is introduced to a cellular mobile communication system (hereinafter, an "LTE system") configured according to 3GPP standards.

Embodiment (LTE System)

Figure 1:
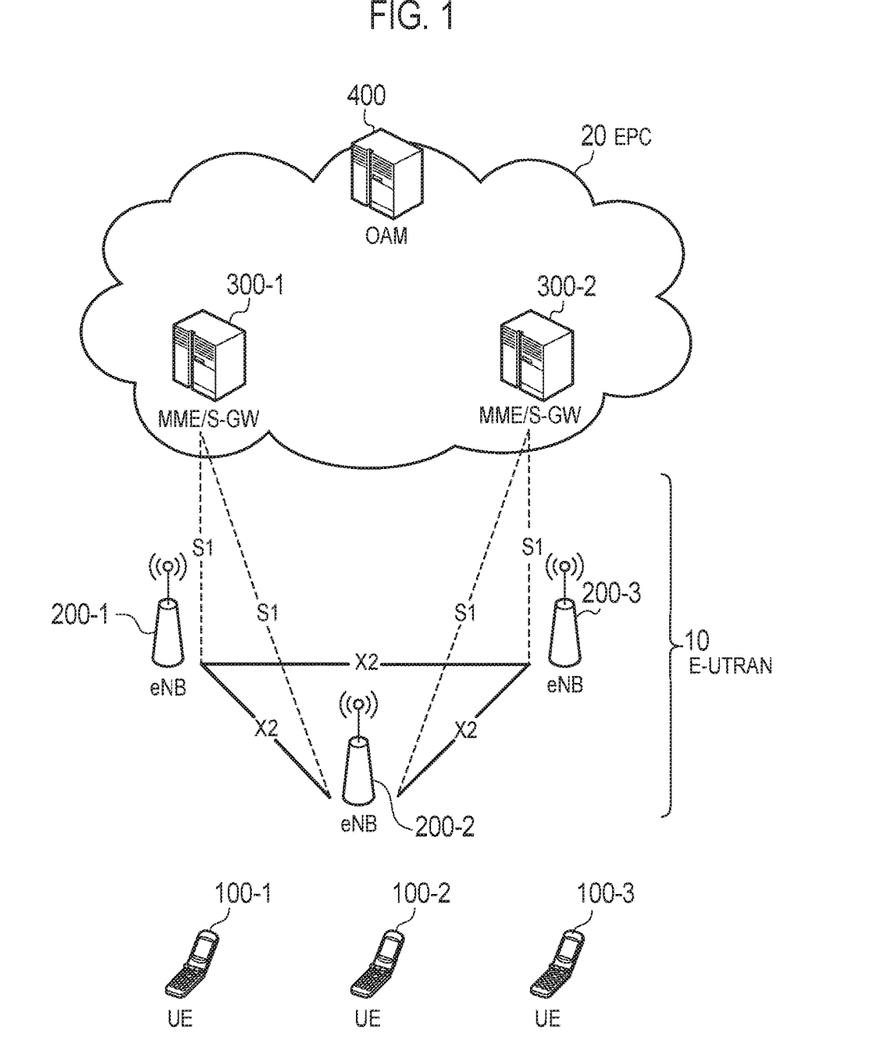
FIG. 1 is a configuration diagram of an LTE system.

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400. In addition, the EPC 20 corresponds to a core network.

The MME is a network node for performing various mobility controls, for example, for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
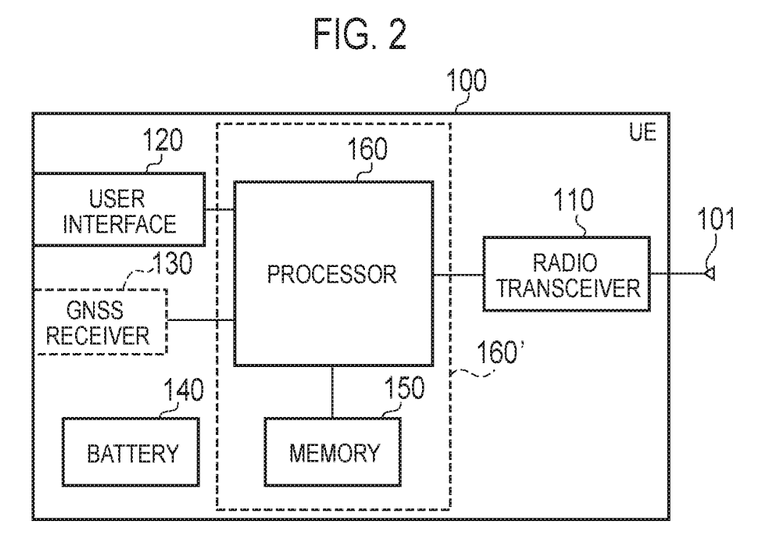
FIG. 2 is a block diagram of a UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller.

The UE 100 may not have the GNSS receiver 130. Furthermore, the memory 150 may be integrally formed with the processor 160, and this set (that is, a chipset) may be called a processor 160' constituting a controller.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into a baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
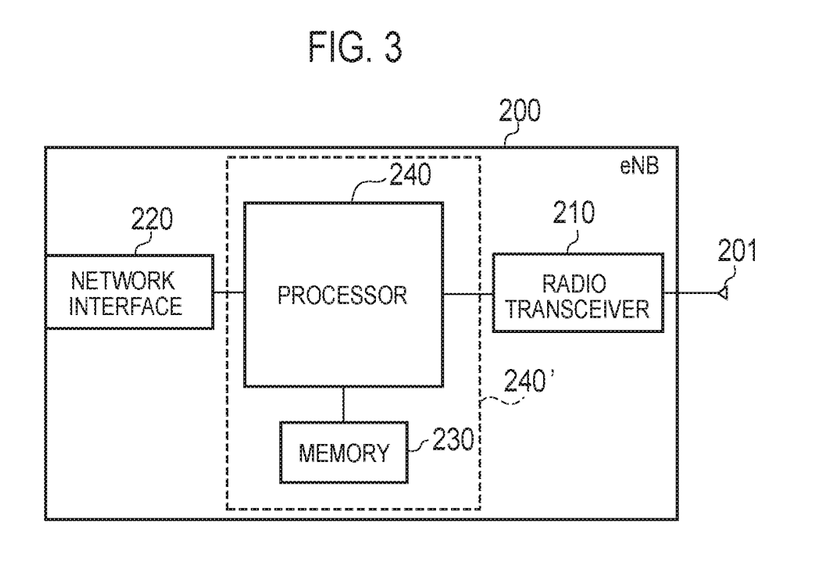
FIG. 3 is a block diagram of an eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller. In addition, the memory 230 may be integrated with the processor 240, and this set (that is, a chipset) may be called a processor 240' constituting a controller.

The antenna 201 and the radio transceiver 210 are used to transmit and receive a radio signal. The antenna 201 includes a plurality of antenna elements. The radio transceiver 210 converts a baseband signal output from the processor 240 into the radio signal, and transmits the radio signal from the antenna 201. Furthermore, the radio transceiver 210 converts the radio signal received by the antenna 201 into a baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
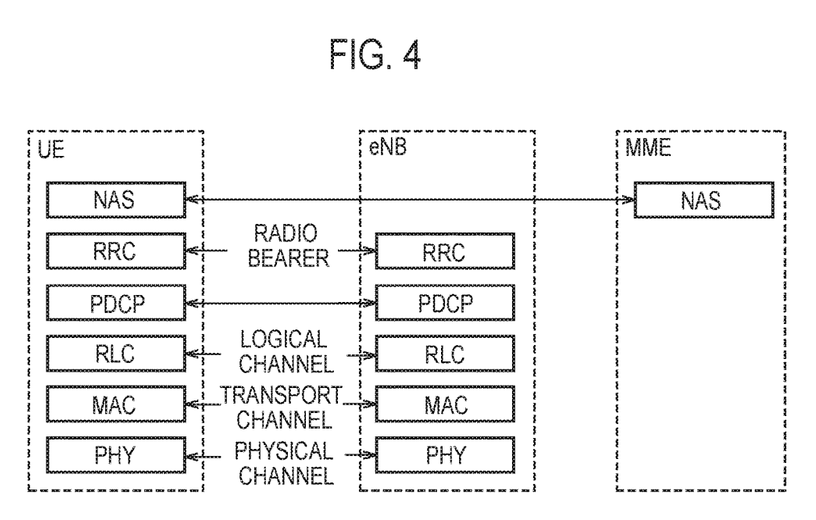
FIG. 4 is a protocol stack diagram of a radio interface in an LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler for determining a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management and mobility management, for example.

Figure 5:
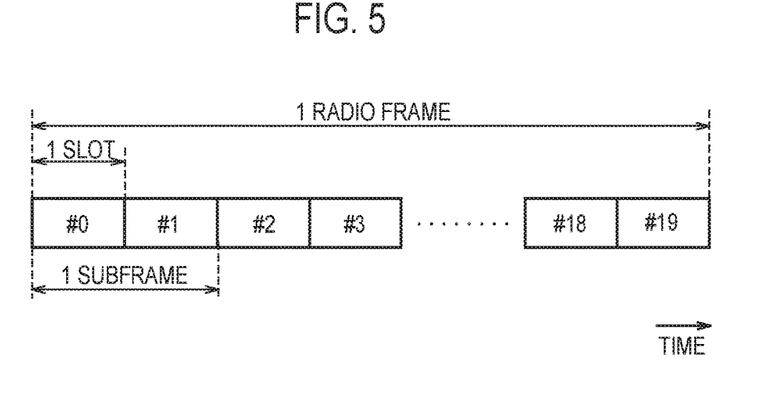
FIG. 5 is a configuration diagram of a radio frame used in an LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

In the uplink, both end portions in the frequency direction of each subframe are control regions mainly used as a physical uplink control channel (PUCCH). Furthermore, the center portion in the frequency direction of each subframe is a region that can be mainly used as a physical uplink shared channel (PUSCH). Moreover, in each subframe, a demodulation reference signal (DMRS) and a sounding reference signal (SRS) are arranged.

(D2D Communication)

Next, a description is given with comparing the D2D communication with the normal communication (the cellular communication) in the LTE system.

Figure 6:
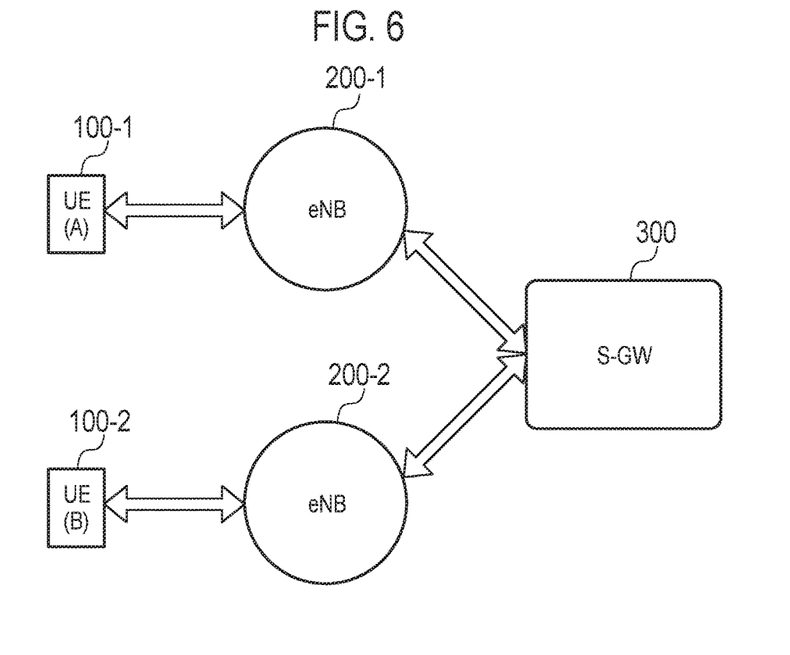
FIG. 6 is a diagram showing a data path in cellular communication.

FIG. 6 is a diagram illustrating a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the core network. Specifically, the data path is set to pass through the eNB 200-1, the S-GW 300, and the eNB 200-2.

Figure 7:
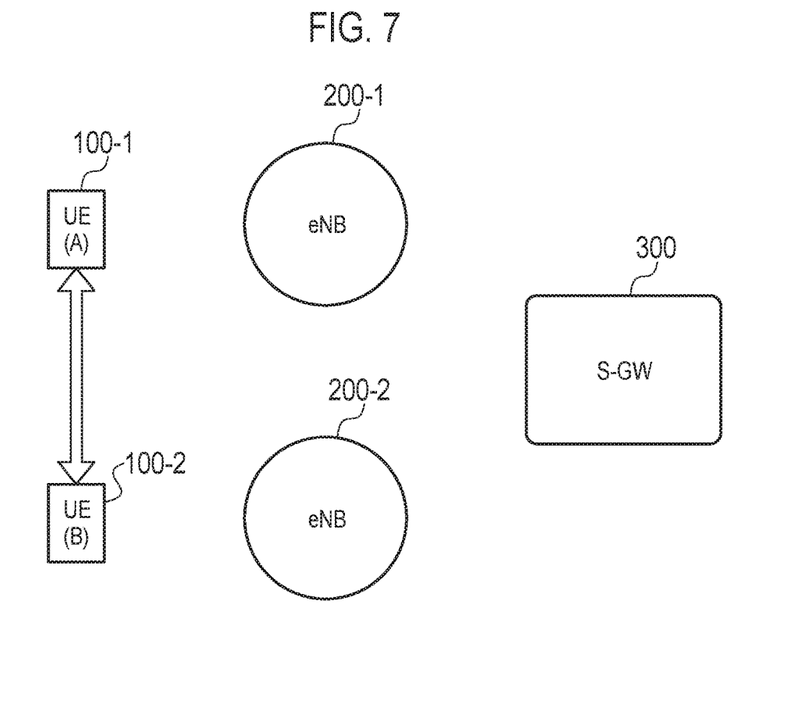
FIG. 7 is a diagram showing a data path in D2D communication.

FIG. 7 is a diagram illustrating a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

For example, one UE 100 of the UE 100-1 and the UE 100-2 discovers the other UE 100 existing in the proximity of the one UE 100, so that the D2D communication is started. It is noted that, in order to start the D2D communication, an UE 100 has a (Discover) function of discovering another UE 100 existing in the proximity of the UE 100. In addition, an UE 100 has a (Discoverable) function of being discovered by another UE 100.

As illustrated in FIG. 7, the data path of the D2D communication does not pass through the core network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the core network and a battery consumption amount of the UE 100 are reduced, for example. In addition, in a mode called Locally Routed, a data path goes through the eNB 200 without going through the S-GW 300.

(D2D Terminal List)

The network manages the UE 100 that performs D2D communication. In the present embodiment, the eNB 200 has a D2D terminal list, and uses the D2D terminal list to manage the UE 100 that performs D2D communication.

The D2D terminal list is a list of UEs 100 that perform D2D communication. Specifically, on the D2D terminal list, information on the UEs 100 that exist in its own cell managed by the eNB 200 and perform D2D communication are recorded. Examples of the information on the UE 100 include an identifier of the UE 100, location information, an identifier of a communication partner of the UE 100, location information of the communication partner of the UE 100, and an identifier of a cell in which the communication partner of the UE 100 exists. It is noted that information on the UE 100 that exists in a neighboring cell adjacent to its own cell and that performs D2D communication may be recorded.

It is noted that when the UE 100 exists in a cell, the UE 100 is in a state of establishing a connection with the cell (connection state) or a state of camping on the cell (idle state).

When the UE 100 that exists in its own cell starts D2D communication or performs D2D communication, the eNB 200 records the UE 100 in the D2D terminal list.

Further, when the UE 100 recorded in the D2D terminal list ends the D2D communication, the eNB 200 deletes the UE 100 recorded in the D2D terminal list. Further, when the UE 100 establishes the connection with a cell managed by the neighboring eNB 200 adjacent to the eNB 200, the eNB 200 may delete the UE 100 recorded in the D2D terminal list, or when the UE 100 establishes the connection with a different cell from its own cell and the neighboring cell, the eNB 200 may delete the UE 100 recorded in the D2D terminal list.

The eNB 200 determines whether the UE 100 performs D2D communication on the basis of the D2D terminal list.

It is noted that the eNB 200 may periodically or aperiodically acquire the D2D terminal list provided in the neighboring eNB 200 via the X2 interface from the neighboring eNB 200 adjacent to the eNB 200. The eNB 200 is capable of updating the D2D terminal list provided in the eNB 200 on the basis of the D2D terminal list acquired in the neighboring eNB 200.

(Simplified Operation of Mobile Communication System According to Embodiment)

Figure 8:
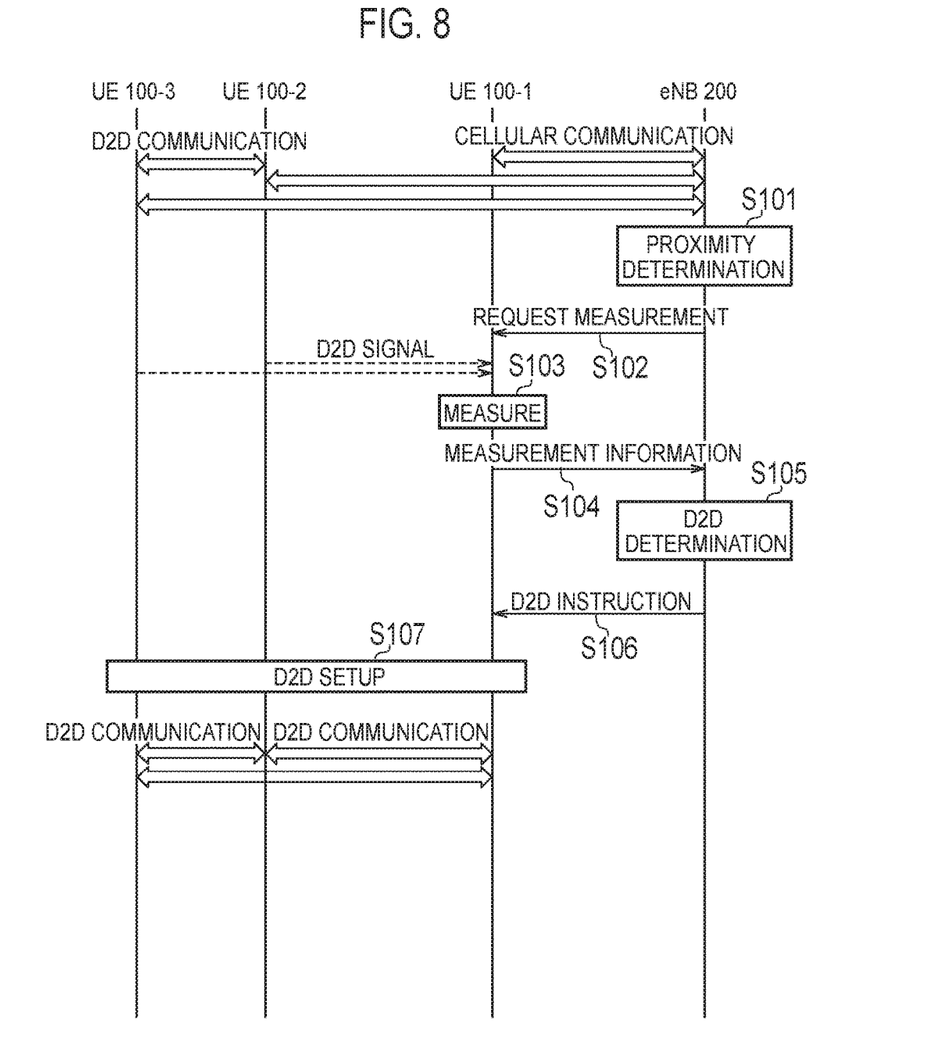
FIG. 8 is a sequence diagram showing an operation example of a mobile communication system according to the embodiment.

Next, a simplified operation of a mobile communication system according to the embodiment will be described by using FIG. 8. FIG. 8 is a sequence diagram showing an operation example of a mobile communication system according to the embodiment.

In the present embodiment, the UE 100-1, the UE 100-2, and the UE 100-3 establish a connection with the cell managed by the eNB 200. Further, as shown in FIG. 8, in the embodiment, the UE 100-1 performs cellular communication, via the eNB 200 and a core network (not shown), with the UE 100-2 and the UE 100-3. Further, between the UE 100-2 and the UE 100-3, the D2D communication is performed.

It is noted that description proceeds with an assumption that the eNB 200 controls the D2D communication between the UE 100-2 and the UE 100-3. Therefore, the eNB 200 assigns a radio resource used by the UE 100-2 and the UE 100-3 to perform D2D communication, and transmits scheduling information indicating the assigned radio resource, to the UE 100-2 and the UE 100-3.

In the present embodiment, when the UE 100-1 performs the cellular communication with the UE 100-2 and the UE 100-3 between which the D2D communication is performed, the eNB 200 executes a process in step S101.

As shown in FIG. 8, in step S101, the eNB 200 determines whether or not there is the UE 100-1 near the UE 100-2 and the UE 100-3 that are partner terminals of the cellular communication with the UE 100-1. Specifically, the eNB 200 makes the determination according to at least any of the following (A) to (D).

(A) Determination Pattern 1

The eNB 200 determines whether or not there is the UE 100-1 near the UE 100-2 and the UE 100-3 on the basis of a cell in which the UE 100-1, the UE 100-2, and the UE 100-3 exist.

Specifically, the eNB 200 determines on the basis of the D2D terminal list that when the cell to which the UE 100-1 is connected is identical or adjacent to the cell in which at least one of the UE 100-2 and the UE 100-3 exists, there is the UE 100-1 near the UE 100-2 and the UE 100-3. That is, the eNB 200 determines that when at least one of the UE 100-2 and the UE 100-3 exists in a cell to which the UE 100-1 is connected or in a cell adjacent to the cell, there is the UE 100-1 near the UE 100-2 and the UE 100-3.

It is noted that the eNB 200 may determine that when both the UE 100-2 and the UE 100-3 exist in a cell to which the UE 100-1 is connected or in a neighboring cell, there is the UE 100-1 near the UE 100-2 and the UE 100-3.

(B) Determination Pattern 2

The eNB 200 determines whether or not there is the UE 100-1 near the UE 100-2 and the UE 100-3 on the basis of location information of each of the UE 100-1, the UE 100-2, and the UE 100-3.

The eNB 200 determines on the basis of location information of the UE 100-1 and location information of the UE 100-2 that there is the UE 100-1 near the UE 100-2 when a distance between the UE 100-1 and the UE 100-2 is equal to or less than a threshold value. Similarly, the eNB 200 determines whether or not there is the UE 100-1 near the UE 100-3.

Further, the eNB 200 may consider that when a distance between the UE 100-1 and one of the UE 100-2 and the UE 100-3 is equal to or less than a threshold value, a distance between the UE 100-1 and the other of the UE 100-2 and the UE 100-3 is equal to or less than a threshold value.

It is noted that the eNB 200 may request the location information to each of the UE 100-1, the UE 100-2, and the UE 100-3 to acquire the location information of each UE 100 (the UE 100-1, the UE 100-2, and the UE 100-3). Further, the eNB 200 may acquire the location information of each UE 100 from an upper device (MME, for example) of the eNB 200.

Further, when determining that there is not the UE 100-1 near the UE 100-2 and the UE 100-3, the eNB 200 may periodically or aperiodically request each UE 100 to transmit the location information of each UE 100, and the eNB 200 may periodically request each UE 100 to transmit the location information. Further, when each UE 100 is set apart by a predetermined value or more from a location indicated by the location information transmitted to the eNB 200, the eNB 200 may request each UE 100 to transmit the latest location information.

(C) Determination Pattern 3

The eNB 200 determines whether or not there is the UE 100-1 near the UE 100-2 and the UE 100-3 on the basis of a proximity notification indicating that there is the UE 100-1 near the UE 100-2 and the UE 100-3.

Firstly, the eNB 200 requests the location information to each of the UE 100-2 and the UE 100-3 to acquire the location information from each of the UE 100-2 and the UE 100-3.

Next, the eNB 200 transmits the location information of each of the UE 100-2 and the UE 100-3, to the UE 100-1. The UE 100-1 receives the location information of each of the UE 100-2 and the UE 100-3.

The UE 100-1 determines whether or not there is the UE 100-1 near the UE 100-2 and the UE 100-3 on the basis of the received location information of each of the UE 100-2 and the UE 100-3. Specifically, the UE 100-1 determines on the basis of a current location of the UE 100-1 and the location information of the UE 100-2 that there is the UE 100-1 near the UE 100-2 when the distance between the UE 100-1 and the UE 100-2 is equal to or less than a threshold value. Similarly, the eNB 200 determines whether or not there is the UE 100-1 near the UE 100-3.

When determining that there is the UE 100-1 near the UE 100-2 and the UE 100-3, the UE 100-1 transmits the proximity notification to the eNB 200.

When receiving the proximity notification, the eNB 200 determines that there is the UE 100-1 near the UE 100-2 and the UE 100-3.

It is noted that the eNB 200 may transmit the location information received periodically or aperiodically from each of the UE 100-2 and the UE 100-3, to the UE 100-1.

(D) Determination Pattern 4

The eNB 200 determines, on the basis of discovery information indicating that a discovery-use signal for discovering a partner terminal for D2D communication (hereinafter, referred to as "Discovery signal") is received, whether or not there is the UE 100-1 near the UE 100-2 and the UE 100-3.

Firstly, the eNB 200 requests at least any one of the UEs 100, that is, the UE 100-1, the UE 100-2, and the UE 100-3, to transmit the Discovery signal. Here, description proceeds with an assumption that the UE 100-2 and the UE 100-3 receive the transmission request for the Discovery signal.

The UE 100-2 and the UE 100-3 transmit the Discovery signal on the basis of the request. When receiving the Discovery signal from each of the UE 100-2 and the UE 100-3, the UE 100-1 transmits discovery information indicating that the Discovery signal is received, to the eNB 200.

When receiving the discovery information, the eNB 200 determines that there is the UE 100-1 near the UE 100-2 and the UE 100-3.

When determining that the UE 100-1 comes close to the UE 100-2 and the UE 100-3 in accordance with at least any one of the above determination patterns (A) to (D), the eNB 200 executes a process in step S102.

In step S102, the eNB 200 sends a measurement request to the UE 100-1. The UE 100-1 receives the measurement request.

The measurement request is information requesting a measurement of a reception intensity of a signal transmitted from the UEs 100 (the UE 100-2 and the UE 100-3) that perform D2D communication.

Further, the eNB 200 may transmit scheduling information indicating a radio resource assigned to the UE 100-2 and the UE 100-3 to perform D2D communication, to the UE 100-1.

Further, the eNB 200 may transmit to the UE 100-1 radio resource information indicating a radio resource for transmitting scheduling information to the UEs 100 (the UE 100-2 and the UE 100-3) that perform D2D communication.

The UE 100-1 can receive the scheduling information, on the basis of the received radio resource information.

Further, the eNB 200 may transmit decoding information for decoding the scheduling information. The UE 100-1 can decode the scheduling information, on the basis of the decoding information.

Further, the eNB 200 may transmit to the UE 100-1 a threshold value used for determining whether or not to transmit measurement information described later.

In step S103, the UE 100-1 measures a signal transmitted from the UE 100-2 and the UE 100-3 that perform D2D communication.

The UE 100-2 and the UE 100-3, which perform D2D communication, transmit a D2D signal used in the D2D communication. The UE 100-1 receives the D2D signal transmitted from each of the UE 100-2 and the UE 100-3 to measure the reception intensity of each of the received D2D signals.

The UE 100-1 can estimate, by the scheduling information, a timing at which the UE 100-2 and the UE 100-3 transmit the D2D signal and a frequency band of the D2D signal. The UE 100-1 may measure the reception intensity of the D2D signal in the estimated frequency band at the estimated timing.

Further, the UE 100-1 may receive a D2D reference signal used for D2D communication transmitted from the UE 100-2 and the UE 100-3 to measure the reception intensity of the D2D reference signal. The D2D reference signal is a signal periodically or aperiodically transmitted by the UE 100 that performs D2D communication by a predetermined wave intensity. The D2D reference signal is used by the UE 100 that performs D2D communication to determine whether or not it is possible to continue the D2D communication, for example. Specifically, the UE 100-2 and the UE 100-3 mutually receive the D2D reference signal with a reception intensity having a predetermined value or more to determine that it is possible to continue the D2D communication.

In step S104, the UE 100-1 transmits the measurement information indicating the measured reception intensity of the D2D signal, to the eNB 200. The eNB 200 receives the measurement information.

The UE 100-1 may periodically transmit the measurement information to the eNB 200, and the UE 100-1 may transmit the same to the eNB 200 when the reception intensity exceeds a predetermined threshold value. The predetermined threshold value may be a unique threshold value previously stored in the UE 100-1, or may be a threshold value received from the eNB 200 described in step S102.

In step S105, the eNB 200 determines whether or not the UE 100-1 is able to perform D2D communication with the UE 100-2 and the UE 100-3. The eNB 200 determines that the UE 100-1 is able to perform D2D communication with the UE 100-2 and the UE 100-3 when the reception intensity of the D2D signal of each of the UE 100-2 and the UE 100-3 is equal to or more than a predetermined value.

When determining that it is impossible to perform D2D communication, the eNB 200 may perform the proximity determination in step S101, and may periodically or aperiodically transmit the measurement request in step S102 without performing the proximity determination in step S101.

On the other hand, when determining that it is possible to perform the D2D communication, the eNB 200 transmits, in step S106, a D2D instruction to instruct D2D communication to be performed with the UE 100-2 and the UE 100-3. The UE 100-1 receives the D2D instruction.

The eNB 200 may transmit the scheduling information indicating a radio resource assigned to the UE 100-1, the UE 100-2, and the UE 100-3 to perform D2D communication, to the UE 100-1.

In step S107, the UE 100-1, the UE 100-2, and the UE 100-3 perform a D2D setup to establish a D2D link. After establishing the D2D link, the UE 100-1, the UE 100-2, and the UE 100-3 perform the D2D communication.

When the D2D link is established, the UE 100-1 may transmit a completion report reporting that the D2D setup is completed, to the eNB 200. Alternatively, an anchor UE 100 that communicates with the eNB 200, which represents the UE 100-1, the UE 100-2, and the UE 100-3, may transmit the completion report to the eNB 200.

The eNB 200 may update the D2D terminal list on the basis of the completion report, and may update the D2D terminal list when transmitting the D2D instruction in step S106.

Summary of Embodiment

In the present embodiment, the eNB 200 (radio transceiver 210) transmits the measurement request for requesting a measurement of a reception intensity of a D2D signal transmitted from the UE 100-2 and the UE 100-3 that perform D2D communication. The UE 100-1 (the radio transceiver 110) receives the measurement request from the eNB 200. The UE 100-1 (the controller and the radio transceiver 110) measures the reception intensity of the D2D signal transmitted from the UE 100-2 and the UE 100-3, on the basis of the measurement request. The UE 100-1 (the radio transceiver 110) transmits the measurement information indicating the reception intensity, to the eNB 200. The eNB 200 (the radio transceiver 210) receives the measurement information from the UE 100-1. The eNB 200 (controller) determines on the basis of the measurement information whether or not the UE 100-1 is able to perform the D2D communication. When determining that the UE 100-1 is able to perform the D2D communication, the eNB 200 (the controller and the radio transceiver 210) transmits the D2D instruction to instruct the UE 100-1 to perform the D2D communication. When receiving the D2D instruction instructing the D2D communication to be performed from the eNB 200, the UE 100-1 (the controller and the radio transceiver 110) performs the D2D communication with the UE 100-2 and the UE 100-3. As a result, on the basis of the reception intensity of a signal from the UE 100-2 and the UE 100-3 that perform the D2D communication, the eNB 200 determines whether or not the UE 100-1 is able to perform the D2D communication, and thus, it is possible to accurately determine whether or not the UE 100-1 is able to perform the D2D communication. Further, when the UE 100-1 is able to perform D2D communication, the UE 100-1 performs the D2D communication on the basis of the D2D instruction from the eNB 200, and thus, the UE 100-1 is capable of effectively utilizing the D2D communication.

Further, in the present embodiment, when the UE 100-1 performs cellular communication with the UE 100-2 and the UE 100-3, the eNB 200 (the radio transceiver 210) transmits the measurement request. The UE 100-1 (the controller and the radio transceiver 110) measures the reception intensity when performing cellular communication with the UE 100-2 and the UE 100-3. As a result, when the D2D communication is performed rather than the cellular communication, it is possible to effectively utilize the D2D communication and reduce a load of the eNB 200.

Further, in the present embodiment, the eNB 200 (the controller) determines that when at least one of the UE 100-2 and the UE 100-3 exists in a cell to which the UE 100-1 is connected or in a cell adjacent to the cell, there is the UE 100-1 near the UE 100-2 and the UE 100-3, and determines that the UE 100-1 is able to perform D2D communication. As a result, the eNB 200 does not need to transmit a meaningless measurement request and the UE 100-1 does not need to measure a meaningless D2D signal.

Further, in the present embodiment, the UE 100-1 (the radio transceiver 110) transmits the location information of the UE 100-1 to the eNB 200. When determining on the basis of the location information of the UE 100-1 and the location information of each of the UE 100-2 and the UE 100-3 that there is the UE 100-1 near the UE 100-2 and the UE 100-3, the eNB 200 (the controller and the radio transceiver 210) transmits the measurement request. The UE 100-1 (the radio transceiver 110) receives the measurement request transmitted on the basis of the location information, from the eNB 200. As a result, the eNB 200 does not need to transmit a meaningless measurement request and the UE 100-1 does not need to measure a meaningless D2D signal.

Further, in the present embodiment, the UE 100-1 (the radio transceiver 110) receives the location information of each of the UE 100-2 and the UE 100-3, from the eNB 200. When determining on the basis of the location information of each of the UE 100-2 and the UE 100-3 that there is the UE 100-1 (the controller and the radio transceiver 110) near the UE 100-2 and the UE 100-3, the UE 100-1 (the controller and the radio transceiver 110) transmits the proximity notification. When receiving the proximity notification, the eNB 200 (the controller and the radio transceiver 210) transmits the measurement request. The UE 100-1 (the radio transceiver 110) receives the measurement request transmitted on the basis of the proximity notification, from the eNB 200. As a result, the eNB 200 does not need to transmit a meaningless measurement request and the UE 100-1 does not need to measure a meaningless D2D signal.

The UE 100-1 (the radio transceiver 110) receives the Discovery signal from the UE 100-2 and the UE 100-3, and transmits the discovery information indicating that the Discovery signal is received, to the eNB 200. When receiving the discovery information from the UE 100-1, the eNB 200 (the controller and the radio transceiver 210) transmits the measurement request. The UE 100-1 (the radio transceiver 110) receives the measurement request transmitted on the basis of the discovery information, from the eNB 200. As a result, the eNB 200 does not need to transmit a meaningless measurement request and the UE 100-1 does not need to measure a meaningless D2D signal.

Further, in the present embodiment, the eNB 200 (the radio transceiver 210) transmits the scheduling information indicating a radio resource assigned to the UE 100-2 and the UE 100-3 to perform D2D communication, to the UE 100-1. The UE 100-1 (the radio transceiver 110) receives the scheduling information. The UE 100-1 (the controller and the radio transceiver 110) measures the reception intensity on the basis of the scheduling information. As a result, the UE 100-1 can estimate, by the scheduling information, a timing at which the UE 100-2 and the UE 100-3 transmit the D2D signal and a frequency band of the D2D signal. When measuring the reception intensity of the D2D signal in the estimated frequency band at the estimated timing, the UE 100-1 is capable of efficiently measuring the reception intensity.

Further, in the present embodiment, the eNB 200 (the radio transceiver 210) transmits the decoding information for the UE 100-1 to decode the scheduling information, to the UE 100-1. The UE 100-1 (the radio transceiver 110) receives the decoding information from the eNB 200. The UE 100-1 (the controller) uses the decoding information to decode the scheduling information. As a result, the UE 100-1 can receive the scheduling information to decode the received scheduling information. The UE 100-1 is capable of efficiently measuring the reception intensity of the D2D signal on the basis of the decoded scheduling information.

Further, in the present embodiment, the eNB 200 (the radio transceiver 210) transmits to the UE 100-1 a threshold value used for determining whether or not the UE 100-1 transmits the measurement information. The UE 100-1 (the controller and the radio transceiver 110) transmits the measurement information to the eNB 200 when the reception intensity exceeds the threshold value. As a result, the eNB 200 can control the transmission of the measurement information. For example, when permitting to perform D2D communication by transmission power having a predetermined value or more, the eNB 200 can transmit a threshold value lower than a reference value, to the UE 100-1. On the other hand, when permitting to perform D2D communication only by transmission power less than a predetermined value, the eNB 200 can transmit a threshold value higher than a reference value, to the UE 100-1.

Further, in the present embodiment, the D2D signal may be a D2D reference signal used for D2D communication. The D2D reference signal is used for determining whether or not it is possible to continue the D2D communication, and thus, when the reception intensity of the D2D reference signal is measured, it is possible to ensure a stable D2D communication and possible for the UE 100-1 to start the D2D communication.

Other Embodiments

As described above, the present disclosure has been described with the embodiments. However, it should not be understood that those descriptions and drawings constituting a part of the present disclosure limit the present disclosure. From this disclosure, a variety of alternate embodiments, examples, and applicable techniques will become apparent to one skilled in the art.

For example, in the above-described embodiment, the UE 100-1 performs cellular communication with the UE 100-2 and the UE 100-3; however, this is not limiting. Even when the UE 100-1 performs cellular communication only with the UE 100-2 and does not perform the communication with the UE 100-3, the eNB 200 may transmit the measurement request. That is, the eNB 200 may transmit the measurement request to an UE that perform cellular communication with at least one UE 100 out of a plurality of UEs 100 and that does not perform D2D communication with the plurality of UEs 100.

Further, in the above-described embodiment, when performing cellular communication with the UE 100-2 and the UE 100-3, the eNB 200 transmits the measurement request to the UE 100-1; however, this is not limiting. When the UE 100-1 requests cellular communication or D2D communication with, as a communication partner, the UE 100 that performs D2D communication, the eNB 200 may transmit the measurement request.

Further, in the above-described embodiment, when there is the UE 100-1 near the UE 100-2 and the UE 100-3, the eNB 200 transmits the measurement request; however, this is not limiting. The eNB 200 may transmit the measurement request without making the proximity determination.

Further, in the above-described embodiment, the UE 100-1 measures the reception intensity of the D2D signal of each of the UE 100-2 and the UE 100-3; however, this is not limiting. For example, when performing cellular communication with the UE 100-2, the UE 100-1 may measure the reception intensity of the D2D signal of the UE 100-1 and may not measure the reception intensity of the D2D signal of the UE 100-3. Therefore, the UE 100-1 may transmit the measurement information indicating the reception intensity of a signal of the UE 100-2 only, to the eNB 200. Further, when there is the anchor UE 100, as a representative, that performs communication with the eNB 200 for D2D communication, the UE 100-1 may measure the reception intensity of the D2D signal of the anchor UE 100, and may not measure the reception intensity of other UEs 100. In this case, the eNB 200 transmits an identifier of the anchor UE 100 to the UE 100, and the UE 100-1 measures the reception intensity of the D2D signal of the anchor UE 100, on the basis of the identifier.

Further, in the above-described embodiment, the eNB 200 transmits the D2D instruction to the UE 100-1; however, this is not limiting. The eNB 200 may transmit the D2D instruction not only to the UE 100-1, but also to the UE 100-2 and the UE 100-3. Further, when there is the anchor UE 100, the eNB 200 may instruct the anchor UE 100 to perform D2D communication.

Further, in the above-described embodiment, the eNB 200-1 transmits the scheduling information to the UE 100-1; however, this is not liming. The UE 100-1 may receive on the basis of radio resource information indicating a radio resource transmitting scheduling information destined not to the UE 100-1 but to the UE 100-2 and the UE 100-3. Further, the UE 100-1 can decode the received scheduling information on the basis of the decoding information.

Further, in the above-described embodiment, the eNB 200 determines whether or not the UE 100-1 is able to perform D2D communication with the UE 100-2 and the UE 100-3; however, this is not limiting. For example, the upper device (MME, for example) of the eNB 200 may use the D2D terminal list to manage the UE 100 that performs D2D communication. That is, the upper device of the eNB 200 may determine whether or not the UE 100-1 is able to perform D2D communication with the UE 100-2 and the UE 100-3. Further, the upper device of the eNB 200 may determine whether or not there is the UE 100-1 near the UE 100-2 and the UE 100-3.

In the aforementioned embodiments, one example of applying the present disclosure to the LTE system is described; however, the present disclosure is not limited to the LTE system, and the present disclosure may be applied to a communication system other than the LTE system.

INDUSTRIAL APPLICABILITY

As described above, the base station, the user terminal, and the processor according to the present disclosure can effectively utilize the D2D communication, and thus, they useful in a mobile communication field.

The invention claimed is:

1. A user terminal in a mobile communication system that supports D2D communication that is direct device-to-device communication, comprising:
 a receiver configured to receive, from a base station, a measurement request for requesting a measurement of a reception intensity of a signal transmitted from another user terminal that performs the D2D communication, wherein the receiver is further configured to receive, from the base station, a threshold value used by the user terminal to determine whether to transmit measurement information related to the reception intensity;

a controller configured to measure the reception intensity of the signal transmitted from the another user terminal on the basis of the measurement request;

a transmitter configured to transmit, to the base station, the measurement information in response to the measurement information satisfying the threshold value, wherein the measurement information enables the base station to perform controls of the D2D communication;

the receiver further configured to receive a location request from the base station, wherein the location request requests transmission of location information indicating geographical location of the user terminal; and in response to the location request, the transmitter further configured to transmit the location information periodically to the base station, wherein the location information enables the base station to perform controls of the D2D communication.

2. A device for a user terminal in a mobile communication system that supports D2D communication that is direct device-to-device communication, comprising:

at least one processor configured to cause the user terminal to execute processes of:

receiving, from a base station, a measurement request for requesting a measurement of a reception intensity of a signal transmitted from another user terminal that performs the D2D communication;

receiving, from the base station, a threshold value used by the user terminal to determine whether to transmit measurement information related to the reception intensity;

measuring the reception intensity of the signal transmitted from the another user terminal on the basis of the measurement request;

transmitting, to the base station, the measurement information in response to the measurement information satisfying the threshold value, wherein the measurement information enables the base station to perform controls of the D2D communication;

receiving a location request from the base station, wherein the location request requests transmission of location information indicating geographical location of the user terminal; and in response to the location request, transmitting the location information periodically to the base station, wherein the location information enables the base station to perform controls of the D2D communication.

3. A method for a mobile communication system that supports D2D communication that is direct device-to-device communication, comprising:

transmitting, from a base station to a user terminal, a measurement request for requesting a measurement of a reception intensity of a signal transmitted from another user terminal that performs the D2D communication;

transmitting, from the base station to the user terminal, a threshold value used by the user terminal to determine whether to transmit measurement information related to the reception intensity;

measuring, at the user terminal, the reception intensity of the signal transmitted from the another user terminal on the basis of the measurement request;

transmitting, from the user terminal to the base station, the measurement information in response to the measurement information satisfying the threshold value, wherein the measurement information enables the base station to perform controls of the D2D communication;

transmitting a location request from the base station to the user terminal, wherein the location request requests transmission of location information indicating geographical location of the user terminal; and in response to the location request, transmitting the location information periodically from the user terminal to the base station, wherein the location information enables the base station to perform controls of the D2D communication.

\* \* \* \* \*